(12) United States Patent
Gaba

(10) Patent No.: US 6,603,408 B1
(45) Date of Patent: Aug. 5, 2003

(54) FLEXIBLE MEMBRANE KEYBOARD

(75) Inventor: Brenda Lewellen Gaba, 9129 Loma Vista Dr., Dallas, TX (US) 75243

(73) Assignee: Brenda Lewellen Gaba, Dallas, TX (US)

( * ) Notice: Subject to any disclaimer, the term of this patent is extended or adjusted under 35 U.S.C. 154(b) by 359 days.

(21) Appl. No.: 09/605,916

(22) Filed: Jun. 28, 2000

Related U.S. Application Data

(63) Continuation-in-part of application No. 09/088,616, filed on Jun. 1, 1998, now abandoned.

(51) Int. Cl.$^7$ .................... H03K 17/94; H03M 11/00
(52) U.S. Cl. ........................ 341/34; 341/22; 200/512
(58) Field of Search .................. 341/22, 34; 200/280, 200/281, 511, 512, 513, 514

(56) References Cited

U.S. PATENT DOCUMENTS

| | | | | |
|---|---|---|---|---|
| 3,600,528 A | * | 8/1971 | Leposavic | 200/512 |
| 5,164,558 A | * | 11/1992 | Huff et al. | 200/512 |
| 5,220,521 A | * | 6/1993 | Kikinis | 341/22 |
| 5,616,897 A | * | 4/1997 | Weber et al. | 200/5 A |

\* cited by examiner

Primary Examiner—Timothy Edwards
(74) Attorney, Agent, or Firm—Michael A. O'Neil

(57) ABSTRACT

A flexible membrane keyboard comprises opposed flexible plastic membranes having pressure sensitive switches embedded therebetween. Each pressure sensitive switch is individual to a particular letter, numeral, symbol, or function. A microprocessor is connected to each of the pressure sensitive switches and generates a keyboard output indicative of the pressure sensitive switch or group of pressure sensitive switches that is actuated at any particular time.

2 Claims, 2 Drawing Sheets

FLEXIBLE MEMBRANE KEYBOARD

CROSS REFERENCE TO RELATED APPLICATION

This application is a continuation-in-part of prior application Ser. No. 09/088,616 filed Jun. 1, 1998, currently abandoned.

TECHNICAL FIELD

This invention relates generally to keyboards for use in conjunction with small computers and other electronic devices, and more particularly to a flexible keyboard which is characterized by the dimensions of a conventional keyboard during use and which is adapted to be rolled and/or folded into a compact configuration for transportation and storage.

BACKGROUND AND SUMMARY OF THE INVENTION

Ongoing miniaturization has characterized the entire developmental history of computing machines. Thus, early vacuum tube-type computers filled entire rooms and required dedicated air conditioning systems to perform rudimentary mathematical functions. The introduction of discrete component transistors was accompanied by size reductions and significant increases in computing power as was the subsequent introduction of the integrated circuit. More recently the introduction of chips comprising many thousands of transistors has facilitated the introduction of powerful computers small enough to be carried in the pocket or purse.

As the size of computers has been reduced, the size of the associated displays and keyboards has also been reduced. Modern palm-top computers, mini laptop computers, personal digital assistants, etc., hereinafter referred to collectively as "small computers," often have keyboards so small as to require the use of a stylus for their operation. Many computer owners find the use of miniature keyboards to be inconvenient and would prefer a keyboard similar in size to a conventional keyboard for document preparation, data input, and similar tasks. However, the size and weight of a conventional keyboard exceed that of a small computer, such that the two are seldom used in combination.

The present invention comprises a flexible membrane keyboard which overcomes the foregoing and other difficulties long since associated with the use of small computers. In accordance with the broader aspects of the invention, there is provided a flexible membrane keyboard having dimensions and key arrangements the same as or similar to a conventional keyboard. The keyboard is light in weight and is adapted to be rolled and/or folded into a compact size to facilitate transportation and storage.

In accordance with more specific aspects of the invention, the keyboard comprises opposed flexible plastic membranes secured in engagement with one another. Pressure sensitive switches are embedded between the flexible plastic membranes and comprise keys of the keyboard. Outputs from the pressure sensitive switches are directed to a microprocessor which in turn directs an output from the keyboard to a computer or similar device.

BRIEF DESCRIPTION OF THE DRAWINGS

A more complete understanding of the invention may be had by reference to the following Detailed Description when taken in conjunction with the accompanying Drawings, wherein.

DETAILED DESCRIPTION

Figure 1:
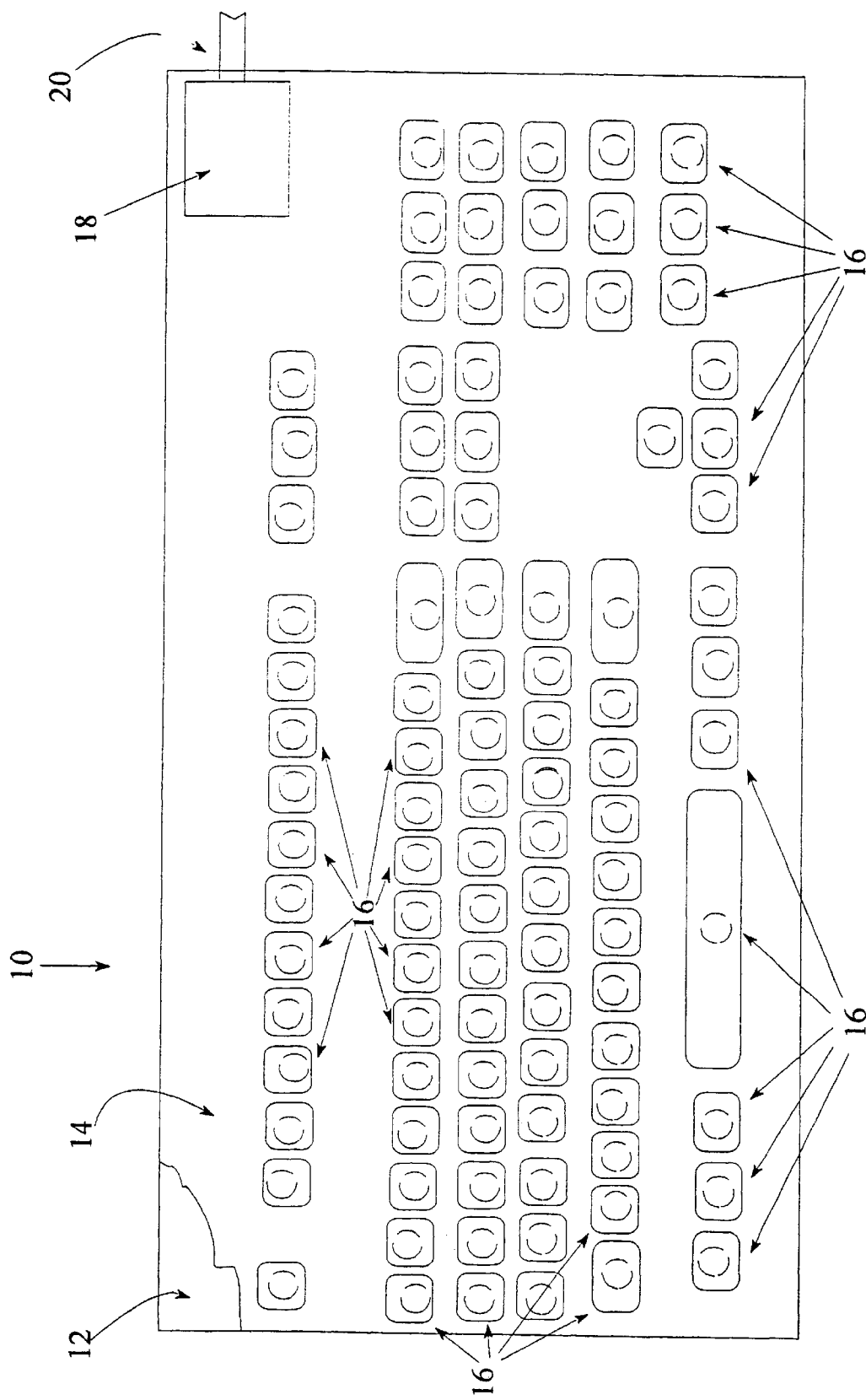
FIG. 1 is a diagrammatic illustration of the keyboard of the present invention.

Referring now to the Drawings, and particularly to FIG. 1, there is shown a flexible membrane keyboard 10 comprising the present invention. The keyboard 10 comprises opposed flexible plastic membranes 12 and 14 secured in engagement with one another. Various commercially available plastic materials may be used in constructing the membranes 12 and 14. The membranes 12 and 14 can be formed from the same or different plastic materials depending upon the requirements of particular applications of the invention.

The keyboard 10 further comprises a plurality of pressure sensitive switches 16 which are embedded between the flexible plastic membranes 12 and 14 comprising the keyboard. The switches 16 are typically identified by a particular letter, numeral, symbol, or function to be inputted by the keyboard 10. The pressure sensitive switches 16 may provide a simple binary output. Alternatively, each pressure switch 16 may provide a complex output individual to the letter, numeral, symbol or function identified by the particular switch 16.

The pressure sensitive switches 16 may be substantially flat and may be embedded between the flexible plastic membranes 12 and 14 such that the surface of the membrane is planar. Alternatively, the pressure sensitive switches 16 may have substantial thickness such that the portion of the membrane 14 overlying each pressure sensitive switch 16 is slightly or substantially raised to facilitate key sensing. Another option is to emboss, score, or otherwise differentiate the portion of the flexible plastic membrane 14 overlying each pressure sensitive switch 16 to facilitate key sensing.

The flexible membrane keyboard 10 of the present invention may have any desired dimensions, and may be either larger or smaller than a conventional keyboard. Preferably, however, dimensions of the keyboard 10 are similar to those of a conventional keyboard, and the arrangement of the pressure sensitive switches 16 comprising the keys of the keyboard is matched to the arrangement of the keys on a conventional keyboard. In this manner operators familiar with the key arrangement of a conventional keyboard are readily adapted to the use of the flexible membrane keyboard 10 of the present invention.

The flexible membrane keyboard 10 further comprises a microprocessor 18 which is connected to each of the pressure sensitive switches 16 comprising the keys of the keyboard. In the case of pressure sensitive switches 16 providing a binary output, the microprocessor 18 is provided with at least one input individual to each pressure sensitive switch 16. In the case of pressure sensitive switches 16 providing a more complex output representative of the letter, numeral, symbol, or function identified by the particular switch 16, the microprocessor 18 has an input compatible with the type of pressure sensitive switch 16 that is used in the keyboard 10. In either event, the function of the microprocessor 18 is to generate a keyboard output indicative of the particular pressure sensitive switch 16 or group of pressure sensitive switches 16 that is actuated at any particular time. The keyboard output signal generated by the microprocessor 18 is directed to a computer or other similar device through an output lead 20 which may be either serial or parallel in nature.

The connection of the pressure sensitive switches 16 to the microprocessor 18 may be accomplished using discrete wires. Preferably, however, printed circuit technology is used to connect the switches 16 to the microprocessor 18. Other conventional techniques for interconnecting electrical components may also be used in the practice of the invention.

Figure 2:
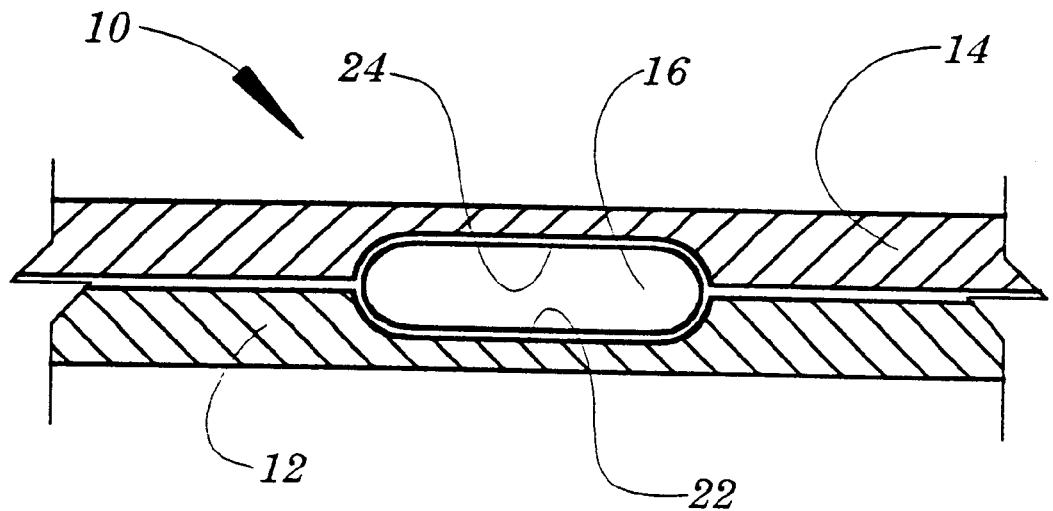
FIG. 2 is an exploded cross sectional view illustrating a first embodiment of the invention.

FIG. 2 illustrates a first embodiment of the invention. Each of the pressure sensitive switches 16 comprises a self-contained pressure sensitive switch enclosed in a housing at least the upper surface of which is sufficiently flexible for actuation by the finger of an operator. The flexible plastic membrane 12 is relieved to provide a plurality of recesses 22 each for receiving one of the pressure sensitive switches 16. Likewise, the flexible plastic membrane 14 is relieved to provide a plurality of recesses 24 each aligned with one of the recesses 22 and for receiving one of the pressure sensitive switches 16. In accordance with the first embodiment of the invention, the upper surface of the flexible plastic membrane 14 is entirely planar.

Figure 3:
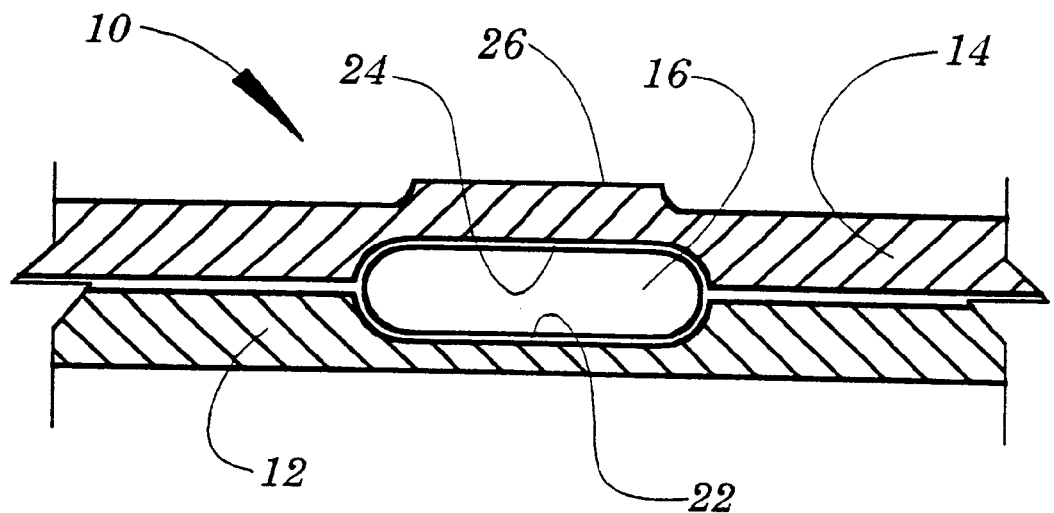
FIG. 3 is an exploded cross sectional view illustrating a second embodiment of the invention.

Referring to FIG. 3, there is shown a second embodiment of the invention. The second embodiment is identical to the first embodiment except that the flexible plastic membrane 14 is provided with a plurality of raised portions 26 each aligned with and identified with one of the pressure sensitive switches 16. The purpose of the raised portions 26 is to locate the fingers of the operator. To this extent, the raised portion 16 are raised above the remaining surface of the flexible plastic membrane 14 by the minimum amount necessary to locate the fingers of the operator.

Those skilled in the art will appreciate the fact that the flexible membrane keyboard of the present invention is readily adapted to serve as an auxiliary keyboard for use with palm-top computers, mini-laptop computers, personal digital assistants, and other small computers. The flexible membrane keyboard 10 of the present invention is extremely light in weight and is therefore readily adapted for transport. The flexible membrane keyboard 10 of the present invention is adapted to be rolled and/or folded into an extremely compact configuration to facilitate both transport and storage. Thus, the flexible membrane keyboard of the present invention combines the benefits of a conventional keyboard and compatibility with small computers.

Although preferred embodiments of the invention have been illustrated in the accompanying Drawings and described in the foregoing Detailed Description, it will be understood that the invention is not limited to the embodiments disclosed, but is capable of numerous rearrangements, modifications, and rearrangements of parts and elements without departing from the spirit of the invention.

I claim:

1. A flexible computer keyboard comprising:

a pair of overlying upper and lower flexible plastic membranes;

a plurality of discrete self-contained pressure sensitive switches each enclosed in a housing having at least a flexible upper surface for operator activation;

each of the switches being embedded between but otherwise independent of said flexible plastic membranes and comprising an individual key of the keyboard;

each of said discrete self-contained pressure sensitive switches adapted for actuation by engagement thereof through said flexible upper surface to generate a predetermined output;

a microprocessor connected to each of said discrete self-contained pressure sensitive switches for generating a keyboard output representative of the particular discrete self-contained switch or group of discrete self-contained switches that is actuated at a particular time;

at least one of the flexible membranes being relieved to provide plurality of interior cavities each for receiving one of said discrete self-contained switches;

the upper surface of the upper flexible membrane comprising a plurality of raised portions aligned with each corresponding discrete self-contained switch.

2. The flexible computer keyboard as in claim 1 wherein at least one of the flexible membranes is relieved to provide a plurality of interior cavities each for receiving one of said discrete self-contained switches.

\* \* \* \* \*